United States Patent [19]

Dennis

[11] Patent Number: 4,790,022
[45] Date of Patent: Dec. 6, 1988

[54] METHOD AND APPARATUS FOR DETECTING COLORED REGIONS, AND METHOD AND APPARATUS FOR ARTICLES THEREBY

[75] Inventor: Timothy J. Dennis, Colchester, United Kingdom

[73] Assignee: Lockwood Graders (UK) Limited, Danbury, England

[21] Appl. No.: 837,045

[22] Filed: Mar. 6, 1986

[30] Foreign Application Priority Data

Mar. 6, 1985 [GB] United Kingdom ............... 8505781
Oct. 2, 1985 [GB] United Kingdom ............... 8524234

[51] Int. Cl.$^4$ ............................................. G06K 9/00
[52] U.S. Cl. .................................... 382/8; 358/106
[58] Field of Search .................. 382/44, 45, 8, 49; 364/725–727, 555; 358/140, 106

[56] References Cited

U.S. PATENT DOCUMENTS

| | | | |
|---|---|---|---|
| 3,231,860 | 1/1966 | Chatten | 382/45 |
| 3,292,149 | 12/1966 | Bourne | 382/45 |
| 4,493,420 | 1/1985 | Dennis | 358/106 |
| 4,541,114 | 9/1985 | Rutenbar | 382/8 |
| 4,631,750 | 12/1986 | Gabriel | 382/44 |
| 4,644,584 | 2/1987 | Nagashima | 382/8 |

FOREIGN PATENT DOCUMENTS 1436638  5/1976  United Kingdom .

Primary Examiner—E. A. Goldberg
Assistant Examiner—Lincoln Donovan
Attorney, Agent, or Firm—Cushman, Darby & Cushman

[57] ABSTRACT

A method of color detection, in which electrical signals derived from two quantities, preferably orthogonal quantities, for example (R−L) and (B−L) are digitized. A time-shift is applied to the signals, either before or after digitization, and a difference signal is formed between each original signal, and its time-shifted counterpart. The difference signals are then used as a key to a "lookup" table, to provide an output only when specified combinations of the two difference signals are encountered.

21 Claims, 5 Drawing Sheets

METHOD AND APPARATUS FOR DETECTING COLORED REGIONS, AND METHOD AND APPARATUS FOR ARTICLES THEREBY

This invention relates to the detection of coloured regions within coloured images, and has particular application to the detecting of colour defects in objects, for example to sort objects according to the presence or absence in them of particular regions of colour.

The invention finds application, for example, in the detection of defects, foreign artcles, or the like in vegetables such as root crops. A number of techniques have been proposed for the detection of such defects, for example that described in European Patent Application No. 0058028. However, the technique described in that specification relies on the existence of distinct edges delimiting the defect area, and thus is not suitable for detecting, for example green areas in potatoes, the edges of which are always diffuse.

A full description of a colour requires specification of three quantities, for example the amounts of Red, Green and Blue primaries required to match that particular colour. An alternative coordinate system is Dominant wavelength (Hue), Luminance, (Lightness or, in the case of self luminous sources, Brightness) and spectral purity (Saturation). For the detection of defects purely by their colour, this latter system has the advantage that one of the components, luminance, can be disregarded.

Information about Dominant wavelength and spectral purity may be represented by position in a two-dimensional plane having as Cartesian co-ordinates the colour difference signals used for transmission of the chrominance information in a PAL colour television system. These are Red minus Luminance, (R−Y) and Blue minus Luminance, (B−Y), where the luminance is derived from:

$$Y = 0.3R + 0.59G + 0.11B,$$

a relationship which was selected originally to ensure compatibility between colour and black and white television transmission. The Y component reflects the luminance as perceived by a human observer and is similar or identical to the signal that would be obtained from a black and white television camera with a spectral sensitivity matching that of the human eye.

When co-ordinate systems such as the PAL colour differences are constructed, it becomes clear that hue may be represented by the angle of the vector linking the origin to a point in the plane, while saturation is represented by the length of the vector. FIG. 1 represents a colour plane in which the (B−Y) and (R−Y) components are considered as x and y axes respectively. A particular combination of RGB tristimulus values would appear on FIG. 1 as a point and in practice in any real situation, where a finite region of an image is under consideration surface texture, noise and the like have the effect of expanding the point to a small area, e.g. B in FIG. 1. In the representation of FIG. 1, spectral purity, (saturation) may be thought of as being represented by the length x of a vector from the origin to the point representing the colour under consideration, and dominant wavelength ("hue") as the angle a between the vector and the X axis.

U.K. Patent Application No. 2040038 discloses a method of colour detection in which a plurality of colours which it is desired to detect are allocated to respective regions of a three-dimensional lookup table in RAM, and each of the said regions is then expanded outwardly from its centre, such that every possible combination of colour co-ordinates is allocated to one of the target colours.

This arrangement is satisfactory in conditions where the surface or article being viewed is presented in a uniform way, and lighting conditions are therefore uniform and optium, but is unsatisfactory where it is desired to examine, for example, colour defects in articles, where not only may the nature of the colour defect be subject to variation, but also lighting conditions may be less well controlled, due, for example, to changes in viewing angle, dependent upon the way in which the article is presented.

In accordance with a first aspect of the present invention an alternative image processing technique is utilised, in which a lookup table is used to detect not the absolute colours of a scanned image, but spatial transition from one colour to another on the image.

In accordance with a first aspect of the invention there is therefore provided a method of colour detection, in which electrical signals derived from two quantities, preferably orthogonal quantities, for example (R−Y) and (B−Y) are digitised. A time-shift is applied to the signals, either before or after digitisation, and a spatial difference signal is formed between each original signal, and its time-shifted counterpart. The spatial difference signals are then used as indices to a "lookup" table, to provide an output only when specified combinations of the two spatial difference signals are encountered.

According to a second aspect of the invention, there is provided a method of detecting a region of an image, having a particular colour, which method comprises scanning the image using a raster-scan technique, to obtain therefrom electrical signals indicative of at least a pair of quantities relating to successive pixels on the raster-scan, the said pair of quantities together containing information relating to both hue and colour saturation, applying at least one time shift to each of the said signals and obtaining a difference signal between each of the said signals and a time-shifted counterpart thereof, the difference signals being indicative of spatial variation of the corresponding electrical colour signal in the image, and applying the said spatial difference signals as an index to a memory device having a plurality of storage locations serving as a lookup table, and adapted to provide an output only for specific combinations of the said difference signals.

Where colour detection techniques make a determination based only the characteristics of a single point of an image, a positive indication will result in the detecting apparatus wherever the corresponding colour co-ordinates appear. Thus, for example in the examination of articles for coloured spots, a positive indication would be given if a coloured spot is detected on conveyor transporting the articles.

In the above described method, where spatial transitions in colour are detected, the target colour is perceived only when adjacent to another specified colour for example, if it is desired to utilise the technique in an agricultural sorting process, such as detecting green spots on potatoes, green is ignored, unless it occurs in close spatial proximetry to the yellow hue of unblemished potatoes. In practice, the processing to determine spatial transitions will generally consist of high-pass filtering the three primary components of a colour television signal, followed by conversion to the selected set of chrominance co-ordinates. In general, the detection of transitions will be carried out in two spatial dimensions.

The lookup table may be generated by scanning a datum image including the colour which it is desired to detect, and storing values in the storage locations dependent upon the frequency of occurrence of the corresponding combination of spatial difference signals produced by the datum image.

The electrical signals utilised may be at least two of the red, green, and blue signals of a conventional RGB television signal. Alternatively, the signals may be any linear combination of these, for example, the $(R-Y)$ and $(B-Y)$ signals discussed above.

The application of a time-shift to the signals, prior to their use as an index to a lookup table has the effect of increasing very greatly the discrimination of the apparatus toward significant occurrences of particular colours, for example the occurrence of a green spot on a yellow potato. In a particularly preferred embodiment, the said electrical difference signals derived from the raster-scan are related to the logarithm of the intensity of the signal at respective points. The logarithms may be derived, either using analogue processing means, or, preferably by utilising a lookup table in RAM to generate the corresponding digital value of the logarithm, for each signal level derived from the raster-scan. The utilisation of logarithmically derived signals in this ways makes the detection process far less prone to variations in absolute lighting intensity.

In the embodiment of the invention which is conceptually the most simple, but technically the most complicated to put into practice, three signals, for example the RGB signals, are utilised, and a spatial difference signal is obtained from each by subtracting from each signal a time-shifted counterpart thereof.

The resulting signals are digitised, either after, or preferably, before the differencing is carried out, and the resulting spatial digital difference signals are applied as address signals to a 3-dimensional RAM array. Thus, the RAM array may be thought of as representing a 3-dimensional colour space, with the three difference signals as its three mutually orthogonal axes.

Any particular combination of primary colour transitions represents a point in the space. The colour transition which corresponds to a particular defect which it is desired to detect may be defined as corresponding to a particular combination of allowed values for each of the three spatial difference signals.

The region of the colour space corresponding to the allowed value will generally be expanded, for example to form a "sphere" in the notional colour space, by labelling additional RAM locations as corresponding to the colour transition of interest, to accommodate saturation changes in the article.

The disadvantage of utilising a 3-dimensional lookup table is that the amount of memory required is very substantial. Thus, if the spatial colour differences are quantised to eight bits, the lookup table would need 2**24 locations (16777216). This makes this proposed arrangement unwieldy and uneconomical.

Accordingly, in a preferred embodiment, three spatial difference signals may be obtained, and applied in pair combinations as indices to three separate 2-dimensional lookup tables. Outputs from the said lookup tables are then combined, to provide the said output for specific combinations of the spatial difference signals.

The memory requirements of such an arrangement are far less, but the notional volume in the colour difference space approximates much less closely to that of a sphere.

In an alternative embodiment which is even less demanding of memory, each of the three spatial difference signals may be used as an index to a 1-dimensional lookup table, and outputs from each of the 1-dimensional lookup tables may be combined to provide the desired output. In this case, the memory requirements are very much reduced, but the notional volume in the colour difference space is a parallelepiped, rather than a sphere.

Calibration of the lookup table may be carried out in any one of a number of ways. In one embodiment, the camera may be directed at a datum image, including a particular colour transition of interest. The appropriate memory locations are then incremented, in accordance with the frequency of occurrence of the corresponding combination of spatial difference signals resulting from the datum image.

The memory locations are preferably multi-bit, since this enables weighting to be applied to hues within a region in the colour space. This enables the system to provide greater flexibility of response than if the memory locations were simply single bit, and capable of providing no more than a simple on/off response.

The invention also provides apparatus for carrying out the various methods described above. In particular, one aspect of the invention provides apparatus for detecting a coloured region of an object, which apparatus comprises a colour television camera for viewing the object, means for deriving from the colour television camera at least a pair of electrical output signals together containing information relating to both dominant wavelength and spectral purity, means for applying at least one time shift to each of the said electrical signals, and for obtaining from each of the signals a spatial difference signal by differing each of the signals and its time-shifted counterpart, means for generating at least a pair of digital values corresponding to the values of spatial difference signals, an electronic memory device having a plurality of storage locations provided with corresponding address lines to allow the selection of respective ones of said memory locations, means for applying the said digital values as address signals to the said address lines thereby to identify each storage location as being associated with a particular combination of the said spatial difference signals, and means for reading from the memory locations a value which is dependant upon whether or not the colour television camera is viewing a particular chosen colour transition.

The invention also provides apparatus for sorting objects according to colour, or colour defects, which apparatus comprises means for conveying objects to be sorted through an inspection region, including a colour camera as described above, apparatus as described above for detecting coloured regions on the objects, and means for routing in different directions objects in which coloured regions are detected.

In the construction of a 3-dimensional lookup table with random access memory, (RAM), the digital amplitudes of the respective "colour difference" signals are used to define an address in the RAM lookup table. Each location within the RAM contains a value corresponding to the desired response of the system for the spatial colour difference corresponding to that RAM location, so that the values in the whole bank of RAM in effect represent the desired response of the system to every signal combination that could arise. In the detection of a single colour transition, most of the addresses would contain zero, with only addresses in the volume of interest containing non-zero data. The output of the lookup table is examined and local concentrations of non-zero outputs then indicate detection of the particular hue difference of interest. By providing a lookup table with multi-bit words, a weighting can be applied to hues within a region in the colour space, which gives greater flexibility of response than if the system provided a simple on/off output.

In particular, as indicated above, the digital values applied as indices to the lookup table may preferably bear a logarithmic relationship to the amplitude of the corresponding signals derived from the colour television camera, as indicated above.

In accordance with a further aspect of the invention, an alternative method of improving the detection of coloured regions in articles has been discovered, which may preferably be utilised in conjunction with the aforesaid spatial differencing method described above, but which may be employed independently. The second aspect of the invention is best illustrated with reference to FIG. 1 of the accompanying drawings. As indicated above, FIG. 1 illustrates a theoretical colour plane, in which the two axes are the $(R-Y)$ and $(B-Y)$ axes of convention RGB colour television. The region designated B in FIG. 1 illustrates the region which might be defined in a two-dimensional colour space by directing a colour television camera on to a target image, for example, in the example described above, a potato having a green spot, and labelling the areas of RAM, corresponding to the combination of the $(R-Y)$ and $(B-Y)$ values which occur in a target (Green) region of the target image. The precise shape of this region B however will depend to a very large extent on the exact hue of the particular region of the target image designated, and also, more importantly, on the ambient lighting conditions.

We have ascertained however, that, in a co-ordinate system such as that described in FIG. 1, where a vector X between the region of interest, and the notional origin may be taken as a measure of luminance and/or spectral purity, a more reliable indication of a defect having a particular perceived colour may be obtained by, during calibration of a lookup table corresponding to the two-dimensional colour plane, labelling as corresponding to the colour of interest additional picture points, those additional picture points corresponding to substantially the same dominant wavelength (i.e. the angle a as the said region B), but having difference luminance and/or spectral purity. In particular, by labelling the points falling within a sector of an annulus, delineated by angles $a^1$ and $a^2$ (the angular limits of the region B), and vectors $x^1$ and $x^2$, a more subjectively reliable detection of colour defects may be obtained. The length of the vector $x^1$ will generally be the maximum distance of points within region B from the origin O, whereas the length of the vector $x^2$ may be arbitrary, and determined by experiment. In general, a value of $x^2$ of approximately 10% of $x^1$ has been found satisfactory.

Accordingly, in a further aspect of the invention, there is provided a method of determining which of a plurality of articles include a coloured region of a particular type, which method comprises scanning a target image having a region of the said type using a raster-scan technique, to obtain therefrom electrical signals indicative of at least a pair of quantities relating to successive pixels on the raster-scan, the said pair of quantities together containing information relating to both dominant wavelength and spectral purity, obtaining digital values corresponding to the said electrical signals, and applying the said digital values as an index to a memory device having a plurality of storage locations serving as a lookup table, and adapted to provide an output only for specific combinations of the said digital values, and thereby determining the locations of the lookup table corresponding to the target colour, labelling further storage locations of the lookup table as corresponding to the target colour, the said further storage locations being in regions of the lookup table corresponding to substantially the same dominant wavelength as the said region, but differing luminance and/or spectral purity, and thereby effecting calibration of the lookup table, causing the articles to pass through an inspection region, scanning the articles in the inspection region using the same raster-scan technique, and thereby obtaining corresponding electrical signals from the image of the said articles, deriving corresponding digital values from the said electrical signals, and applying the said digital values as indices to the said memory device, and thereby generating an output for every occurrence on one of the articles of a colour within the aforesaid larger region.

Embodiments of the various aspects of the invention illustrated will now be described with reference to the following drawings in which.

Figure 3:
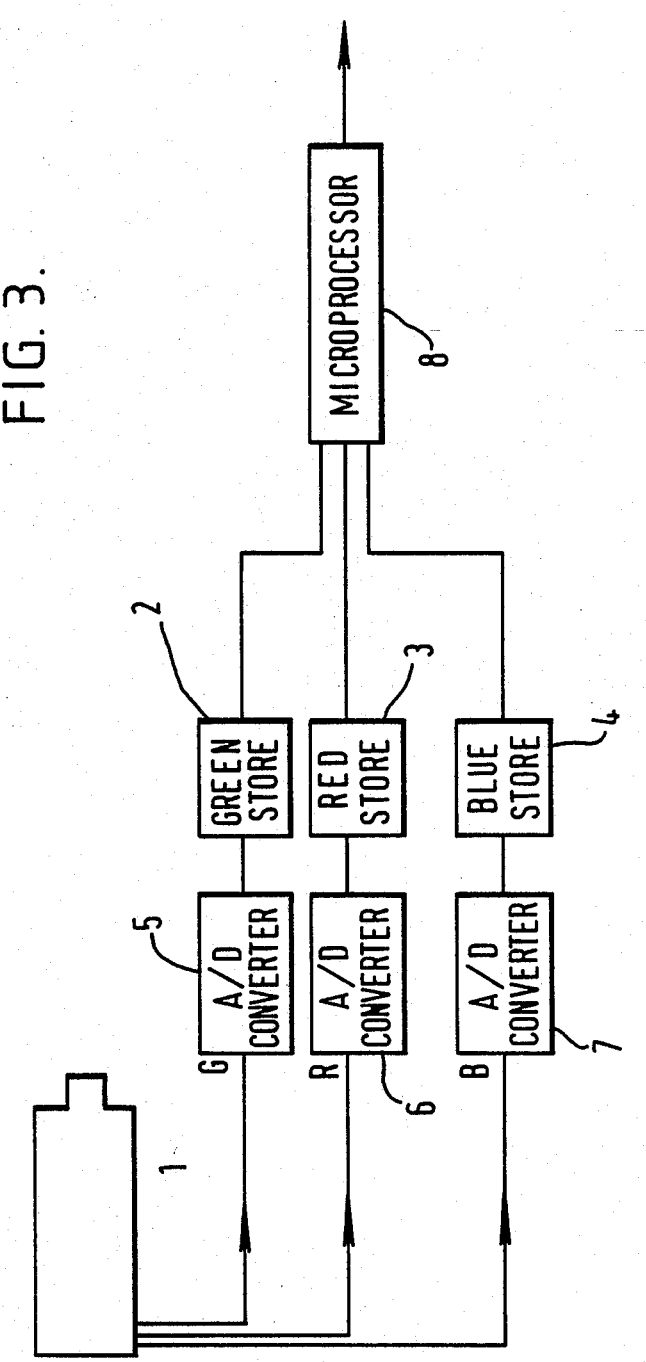
FIG. 3 is a schematic diagram of a rudimentary implementation of the invention.

An elementary software equivalent of the method of the invention is illustrated in the arrangement shown in FIG. 3, which comprises a colour television camera 1 (Philips LDK 44), which produces a conventional gamma-corrected RGB output which is fed to three picture stores for the Green, Red and Blue components (2,3 and 4 respectively), via analogue to digital converters 5,6 and 7.

The picture stores are type R16/4/2/2BH, produced by British Telecom Research Labs, and each consist of a 512 by 512 by 6 bit memory array (RAM), addressed by a 6845 CRT controller, multiplexed in such a way as to allow a video input/output data rate of about 10 MHz. In practice, the analogue to digital converters 5, 6 and 7, and also corresponding digital to analogue convertors (not shown) for output, form part of the picture stores 2, 3 and 4 which are able to handle composite video signal inputs at standard levels.

The picture stores appear within the address space of a 68000 micro-processor 8, and various control registers associated with the picture stores, for example the CRT controller, are also memory mapped. The stores, which normally operate in a free running mode, generate their own timing signals, the "Green" store 2 generating a master clock waveform which drives the other two, and is itself always locked to an external source of video synchronising pulses at 625 line, 50 field/s rates.

An alternative method of operating the stores involves some degree of analogue processing prior to the conversion to digital form. One memory would hold a "luminance" component, and the other two the colouring information, much as in standard PAL broadcast practice.

Indeed, any quantities associated with a colour television signal could be held and stored, provided that it is possible to extract from such quantities the information about dominal wavelength and purity.

The micro-processor 8 is programmed so as to store in the picture stores 2, 3, 4, a "frozen" image, instantaneously viewed by the camera 1. A convolution matrix is subsequently applied to the data in-stores 2, 3 and 4, to produce the equivalent of the colour difference signals. Before the convolution matrix is applied, the microprocessor 8 may calculate the (Red-Luminance) and (Blue-Luminance) components, using the formula $$Luminance = 0.3R + 0.59G \; 30 \; 0.11B,$$

and store the respective values in the Red and Blue stores respectively. (The Green store is thus no longer required for holding picture information, and the 6 bit values stored in the memory locations of the Red and Blue stores represent a pair of orthogonal co-ordinates defining the colour of each respective pixel of the video image as a point on a colour plane as in FIG. 1).

Preferably however a convolution matrix is applied directly to the values stored in the green, red and blue stores 2, 3 and 4, to transform the values stored therein into difference values between spaced points in the green, red and blue elements respectively of the image. The convolution matrix is selected with appropriate elements to emphasise the desired features of the image. For example, a convolution matrix in which all the elements of the first and last columns are "1", and all other elements "0" will emphasise the occurrence of vertical lines in the image.

In order to be able to recognise a particular colour difference, the micro-processor must be "taught" the particular colour difference co-ordinates associated with that colour transition. Accordingly, the colour camera 1 may be directed so as to produce a datum image including a region composed substantially of the particular colour transition of interest.

A two dimensional histogram giving the relative frequency of occurrence of all combinations of the values stored in the Red and Blue stores within the region specified is constructed in computer memory. The histogram consists of an array of integers, which are initially set to zero. Every possible hue difference value that could occur with 6 bit quantisation of the signals in the Red and Blue stores is represented by one location in the array. The datum image is scanned and for each picture element within the datum region of the image, the location in the array pointed to by the combination of spatial colour difference values stored in the stores 2, 3 and 4 is incremented by one. At the end of the scanning process, the array holds the absolute number of times each respective spatial colour difference value occurred within the region of the datum image. The datum region can vary in size, so it is convenient to normalise the histogram so that its maximum is some constant value. 63 is a suitable choice, because it can be readily quantised in 6 bits, and the histogram can therefore, if desired now be moved for display into the green picture store.

The data can be moved into a region of the green picture store corresponding to a square array of 64×64 picture elements of a display screen.

The above description with reference to FIG. 3 is included simply by way of illustration of the type of techniques involved, since the method of the invention must, if it is to be commercially viable, be implemented in hardware. A number of possible hardware implementations are illustrated with reference to FIGS. 2, 4, 5, and 6.

Figure 2:
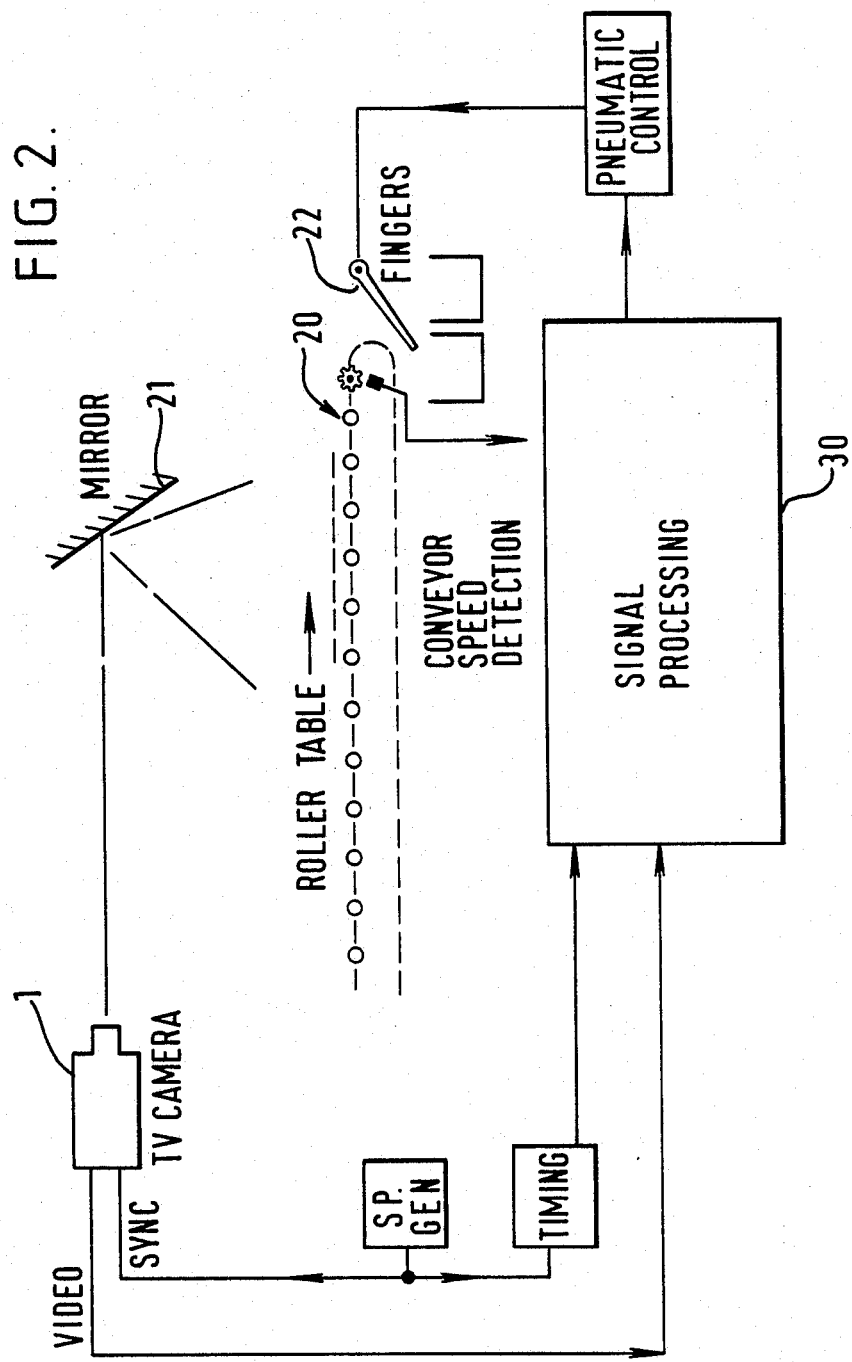
FIG. 2 illustrates apparatus according to the invention for detecting flaws in root crops.

In the apparatus of FIG. 2, the method of the invention is used for detecting coloured blemishes in root crop. For example, green areas in potatoes. Such green areas are produced when tubers have been exposed to light.

The apparatus of FIG. 2 comprises a T.V. camera 1 arranged so as to view potatoes travelling on a roller table 20, via a mirror 21. The roller table and mirror arrangement may be substantially as described in European Patent Aplication No. 0058028, or U.S. Pat. No. 4,351,437.

The roller table preferably comprises a plurality of rollers driven for movement through the inspection region, and for rotation, so as to rotate the articles during their passage through the inspection region. The rollers are preferably driven in such a manner that the combined effect of movement and rotation of the articles in the region is to tend to render substantially stationary an upper point in each article for at least a period of time during its passage through the inspection region (i.e. so that on each revolution, an upper point on each article is instantaneously at rest). It is possible to achieve this by arranging for the lower surfaces of the rollers to be in contact with a fixed surface, whilst the rollers are driven through the inspection region. Moreover, the effect is substantially independent of the size of the articles being treated.

A video signal consisting of red, blue, and green components is fed from the colour television camera 1 to signal processing means 30.

The signal processing means 30 is illustrated in more detail in FIG. 4, and will be described hereinafter. An array of fingers 22 is provided across the width of the roller table, and the roller table moves in the direction shown to convey potatoes through the field viewed by the T.V. camera 1.

Figure 4:
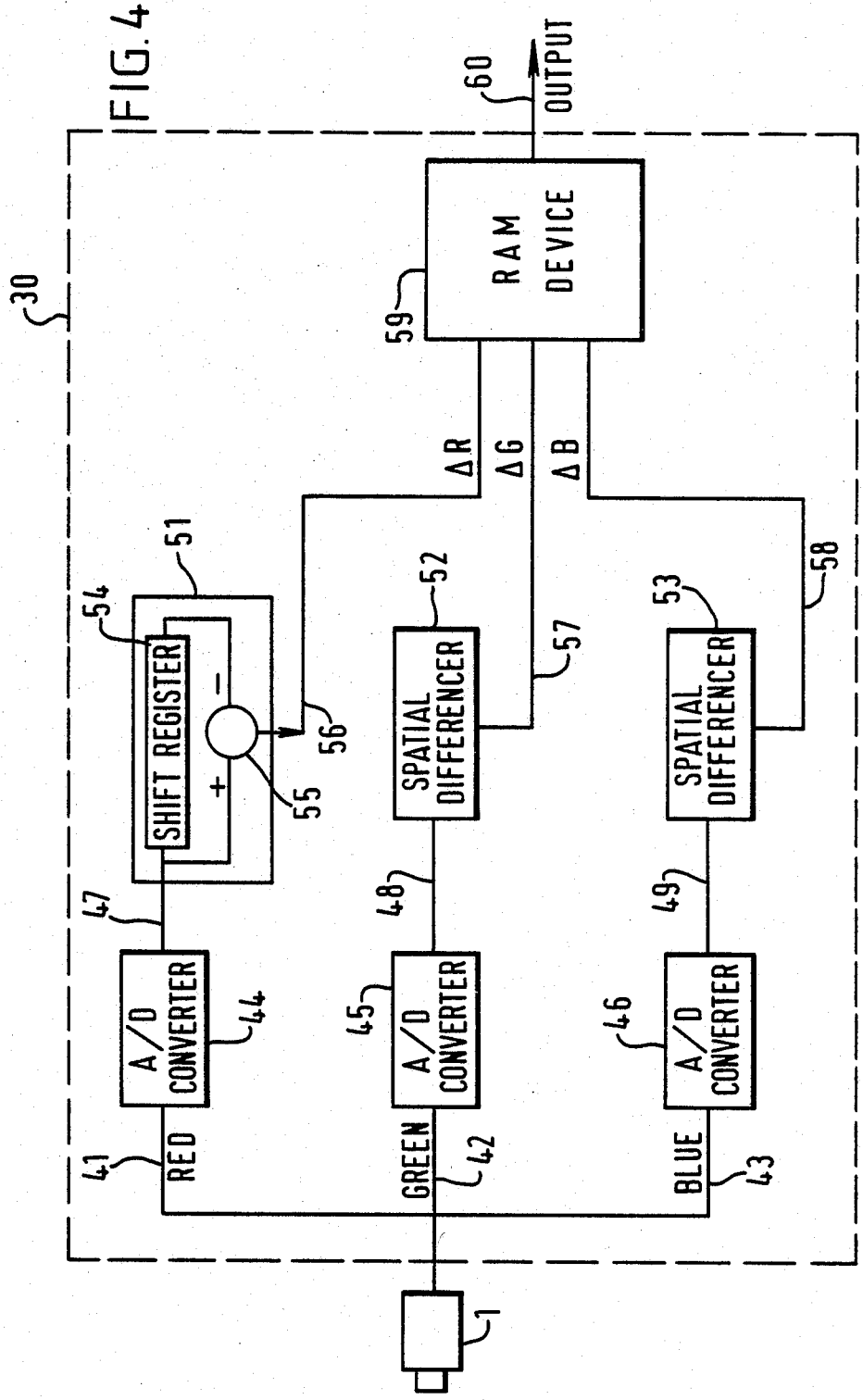
FIG. 4 is a schematic representation of a hardware implementation of the invention for operation in real time and FIGS. 5 and 6 are arrangements for use with the implementation of FIG. 4.

Referring now to FIG. 4, T.V. camera 1 provides red, green, and blue analogue component signals 41, 42, and 43 respectively. The three signals are fed to analogue-to-digital convertors 44, 45, and 46 respectively. Analogue-to-digital convertors 44, 45 and 46 preferably also comprise means for converting each signal 41, 42, 43 into its logarithmic derivative. This may be carried out in known fashion, for example by analogue means prior to digitisation, or by means of a 1-dimensional lookup table in RAM, after digitisation. The resulting digital signals 47, 48 and 49 are quantised to six bits. Digital signals 47, 48, and 49 are applied to the input of 51, 52 and 53 spatial differencers respectively. All three spatial differencers 51, 52 and 53 are identical, and only one (51) is illustrated in detail. Element 51 comprises a shift register 54 for 6 bit words of a suitable size to reflect the desired time shift in the image signals, and a subtractor (configured as a negated adder). In a particular embodiment, the shift register may have sixteen stages, although this may be varied as a result of experiment, to determine the optimum colour discrimination. The digital input 47 is applied to the input of the shift register 54, and as a negated input to an adder 55. A second input to adder 55 is provided by the output from shift register 54. Accordingly, the signal 56 output from the adder is a differece signal between the real-time digital value of the red signal, and the value sixteen pixels previously. Corresponding difference outputs 57 and 58 are obtained from each of the difference elements 52 and 53. The differenced signals 56, 57 and 58 are designated delta R, delta G, and delta B respectively.

The seven bit differenced signals delta R, delta G, and delta B can be quantised to six bits, but are preferably allowed to remain as seven bit values and are applied as address signals to a RAM device 59.

Figure 5:
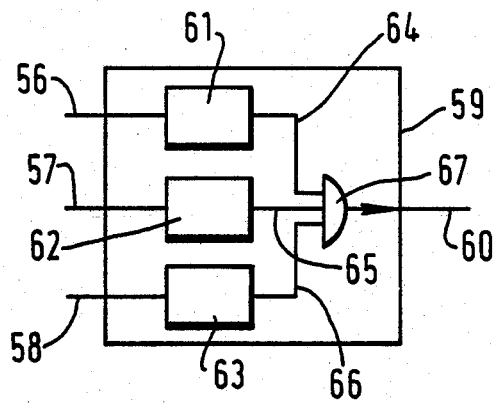
Figure 6:
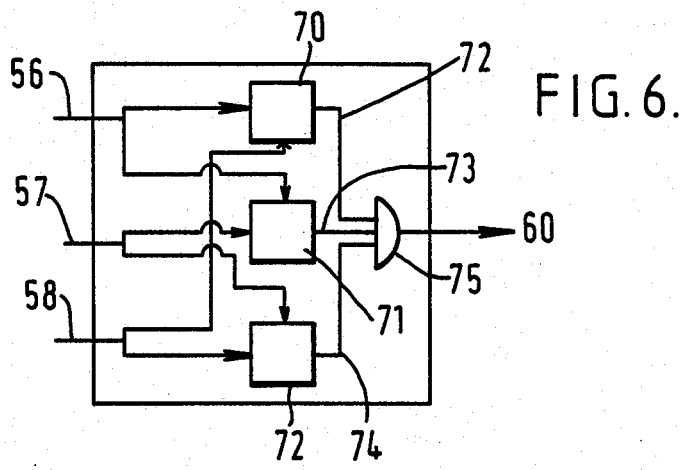

The RAM device 59 may take a number of forms, as will be disclosed with reference to FIGS. 5 and 6. However, in its simplest embodiment, the RAM device 59 is simply a memory array, and the delta R, delta G and delta B signals are applied to respective thirds of the address bus of the array, so that the RAM device 59 functions as a 3-dimensional lookup table. Thus, whenever a desired combination of delta R, delta G and delta B arises, an output is generated on output line 60.

This method of implementing a 3-dimensional lookup table is simple, but very expensive on memory. Thus, if signals 56, 57, and 58 are quantised to eight bits, something in excess of 16,000,000 memory locations are required. A simplified alternative arrangement is illustrated in FIG. 5. In the embodiment of FIG. 5, the RAM device 59 comprises three one-dimensional memory arrays 61, 62 and 63 respectively. Each of the one-dimensional memory arrays provides an output on a corresponding output line 64, 65, and 66, when the corresponding colour difference signal on line 56, 57, or 58 is within defined limits. The three outputs 64, 65, and 66 are then combined, using an AND gate 67, to produce the resulting output 60.

This arrangement is much more economical on memory, since each lookup table 61, 62 and 63 need have only 64 or 128 locations. However, it is more prone to give spurious indications, around the region of interest.

A compromise arrangement is illustrated in FIG. 6. In the arrangement of FIG. 6, three two-dimensional lookup tables 70, 71, and 72 are provided, each having as data input two of the difference signals 56, 57 and 58. Thus, lookup table 70 has inputs signals 56 and 58 etc. Outputs 72, 73 and 74 from the three lookup tables are combined using an AND gate 75, to produce output 60.

The apparatus illustrated above is arranged so as to produce a time shift between pairs of spatially separated pixels along the same scan line of the raster scan. However, by utilising a larger shift register, it is possible to introduce a time-shift between pairs of spatially separated scan lines of the raster scan, so as to produce a "vertical" spatial difference shift in the signals 47, 48 and 49. Any combination of "vertical" and "horizontal" time shifts may be incorporated by a combination of appropriate shift registers.

In a further alternative embodiment, the inputs to analog-to-digital convertors 44, 45, and 46 may be not the "raw" RGB colour signals, but may be composite colour signals, for example (Red - Luminance), (Blue - Luminance), and the Luminance itself. In yet a further alternative embodiment, the Luminance component may be omitted, and two analog-to-digital convertors only utilised.

Before the arrangement of FIG. 4 can be utilised to detect a particular colour in an object, for example a potato, the lookup tables must be calibrated. As indicated above, one method of providing such calculation is by constructing a histogram as outlined above, i.e. by pointing the television camera at a potato containing an area of the shade of green which it is desired to detect and thus a transition between the green of the defect area, and the yellow of the surrounding potato. The area of green is scanned as outlined above, and a lookup table generated in an area of memory, the digitised outputs delta R, delta G, and delta B being applied to the address bus of the RAM, respectively.

Figure 1:
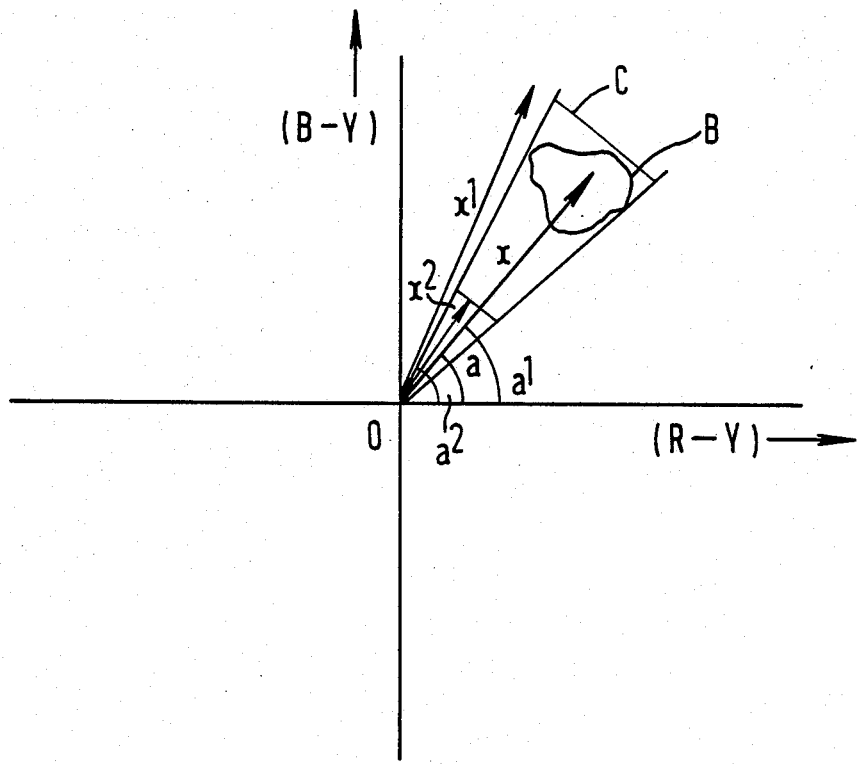
FIG. 1 illustrates a "colour plane"

In an alternative and preferred method of calibrating the lookup table, which may be utilised either with or without the spatial differencing method referred to above, a histogram is first constructed by pointing the television camera at a potato containing an area of the shade of green which it is desired to detect. The $(R-Y)$ and $(B-Y)$ components of the colour television signal are utilised directly as indices to a lookup table in RAM, to define an area in RAM as corresponding to the particular shade of green, for example the area shown as B in FIG. 1. In FIG. 1, the length of the vector X represents spectral purity (saturation) and the angle "a" represents dominant wavelength (hue). In order to allow for the type of variations which occur in practice because of non-perfect viewing angle, variation in illumination and the like, additional locations in the lookup table are labelled as corresponding to the colour of interest, by extending the region B along the direction of the vector X. This results in a sensitive region C, which has the shape of a sector of an annulus, but which in practice can be approximated by a truncated isosceles triangle. The new labelled region C between angles $a^1$ and $a^2$, and vector lengths $x^1$ and $x^2$ is thus sensitive to changes in dominant wavelength or hue, but relatively insensitive to changes in spectral purity (saturation).

This approach is effective for broadening selectivity in a specifically defined way, whenever the co-ordinate system chosen is such that the polar co-ordinates are of the form shown in FIG. 1.

In operation of the detection apparatus, an output is generated from the signal processing means whenever a potato containing the particular green colour is scanned by the T.V. camera. The output is passed to a timing unit 31 which calculates from the position on the raster scan the time which the potato will take to travel to the end of the roller table 20, and deflect the appropriate finger 22 to direct the potato into a reject bin, after the appropriate time delay.

Clearly, various other embodiments other than those specifically described above are included within the present invention. In particular, quantities other than the R.G.B. signals, and (Red-Luminance) and (Blue-Luminance) may be utilised as colour coordinates since the images are not necessarily destined for human observation. One possibility is to generate an 'intensity' coordinate derived from equal weighting of R, G and B, then to express Hue and Saturation in terms of angle about the line $(R=G=B)$ in RGB space and the distance from it respectively. (The line $R=G=B$ corresponds to inputs to the camera having neutral hue). Any other coordinate system would also be possible.

Furthermore, the method may be used to detect colour blemishes in continuous areas of colour, rather than in discrete articles. Signal averaging may be incorporated, as well as pre- and/or post-hue detection filtering, to minimise the effect of false indications.

A similar technique may be used in real time to minimise the "noise" due to localised positive spatial colour differences indications. By providing appropriate delay circuitry, it is possible to examine for each pixel of the image as it is scanned pixels adjacent to it, and thus disregard localised positive colour indications, if they fall wholly within areas not indicated to be positive.

I claim:

1. A method of sorting articles, comprising the steps of:
   inspecting the articles to determine any occurrence of target colours, and
   routing the articles in accordance with the colours detected thereon,
   wherein the articles are inspected by
   scanning the articles using a raster scan technique to develop electrical output signals containing colour information,
   time shafting said electrical output signals to produce time-shifted signals,
   forming the difference between each said electrical output signal and its counterpart time-shifted signal to thereby obtain spatial colour difference signals, and
   applying said spatial colour difference signals to a memory device,
   wherein said memory device has a plurality of storage locations and corresponding address lines allowing access to said storage locations, and wherein information as to target colours is stored in said storage locations,
   and wherein said spatial colour difference signals are applied to said memory device, by way of buffering means, as address signals to the address lines of the memory device to access selected ones of said storage locations,
   and wherein said memory device is arranged to provide an output only when specific combinations of said spatial colour difference signals are applied thereto, said memory device output thereby indicating an occurrence on one of the article of a target colour.

2. A method as claimed in claim 1, wherein the said electrical output signals are mutually orthogonal components of a three-colour television signal or the logarithms thereof.

3. A method as in claimed in claim 1, wherein the said electrical output signals include at least two of the red, green, and blue components of a three-colour television signal or the logarithms thereof.

4. A method as claimed in claim 1, wherein the said electrical output signals are (Red-Luminance) and (Blue-Luminance), wherein luminance is defined as (0.3 Red+0.59 Green+0.11 Blue), or the logarithms thereof.

5. A method as claimed in claim 1, whrein said spatial colour difference signals are applied to a three-dimensional memory device.

6. A method as claimed in claim 1, wherein three said spatial colour difference signals are supplied in three pair combinations to at least two separate two-dimensional memory devices, and outputs from the said memory devices are combined to provide the said output for specific combinations of the said spatial colour difference signals.

7. A method as claimed in claim 1, wherein each of the said spatial colour difference signals is applied individually to at least three separate one-dimensional memory devices, and outputs from each of the said one-dimensional memory devices are combined to provide the said output for specific combinations of the said spatial colour difference signals.

8. A method as claimed in claim 1, wherein the storage locations of said memory device are multi-bit locations.

9. A method according to claim 1, wherein the electrical output signals developed by scanning the articles are arranged to be indicative of at least a pair of quantities relating to successive pixels on the raster scan, the said pair of quantities together containing information relating to both dominant wavelength and spectral purity.

10. A method according to claim 1, further comprising the step of generating data for the said memory device by the steps of scanning a reference article including the target colours, and
    storing values in appropriate ones of the storage locations of said memory device dependent upon the frequency of occurrence in the reference article of the corresponding combination of spatial colour difference signals.

11. A method according to claim 1, wherein digital values of said spatial colour difference signals are obtained and are applied to said memory device as address signals.

12. Apparatus for sorting articles comprising:
    an inspection zone,
    a raster scan apparatus arranged to scan articles in said inspection zone and to develop elecltrical output signals containing colour information,
    means for time shifting said electrical output signals to produce time-shifted signals,
    differencing means for receiving said electrical output signals and said time-shifted signals and arranged to form the difference between each electrical output signal and its counterpart time-shifted signal to thereby form spatial colour difference signals,
    a memory device having a plurality of storage locations and corresponding address lines allowing said storage locations to be accessed, information as to target colours being stored in said storage locations,
    buffering means for applying said spatial colour difference signals as address signals to the address lines of said memory device to access selected ones of said storage locations,
    means enabling an output from said memory device only when specific combinations of said spatial colour difference signals are applied there to, said memory device output thereby indicating an occurrence on one of the articles of a target colour, and
    means for routing the said articles in accordance with the colours detected on the articles.

13. Apparatus according to claim 12, wherein said raster scan apparatus comprises a colour television camera producing television output signals, and processing means deriving said electrical output signals from said television output signals.

14. Apparatus according to claim 13, wherein said buffering means comprise means for obtaining digital values of said spatial colour difference signals.

15. Apparatus according to claim 12, further comprising means for conveying the articles through said inspection zone, and wherein the raster scan apparatus comprises a colour television camera arranged continuously to scan the articles in said inspection zone.

16. Apparatus as claimed in claim 13, wherein the said electrical output signals are mutually orthogonal components of a three-colour television signal.

17. Apparatus as claimed in claim 16, wherein the said electrical output signals include at least two of the red, green and blue components of a three-colour television signal.

18. Apparatus as claimed in claim 16, wherein the said electrical output signals are (Red-Luminance) and (Blue-Luminance), wherein luminance is defined as (0.3 Red+0.59 Green+0.11 Blue).

19. Apparatus as claimed in claim 13, wherein said processing means comprises means for generating logarithms of said television output signals.

20. Apparatus as claimed in claim 9, wherein the memory device is arranged as a three-dimensional lookup table, as two or more separate two-dimensional lookup tables, or as two or more 1-dimensional lookup tables.

21. Apparatus as claimed in claim 12, wherein said storage locations of the memory device are multi-bit locations.

* * * * *

UNITED STATES PATENT AND TRADEMARK OFFICE
CERTIFICATE OF CORRECTION

PATENT NO. : 4,790,022

DATED : December 6, 1988

INVENTOR(S) : Timothy J. DENNIS

It is certified that error appears in the above-identified patent and that said Letters Patent is hereby corrected as shown below:

In column 7, line 24, change "30" to --+--.

In column 9, line 9, "differece" should read -- difference --.

In column 11, line 24, "shafting" should be --shifting--;
line 65, "supplied" should be --applied--.

In column 12, line 37, "eleltrical" should be --electrical--;
line 58, "there to" should be --thereto--.

In column 14, line 8, "9" should be --12--.

Signed and Sealed this

Twenty-third Day of January, 1990

Attest:

JEFFREY M. SAMUELS

*Attesting Officer*     *Acting Commissioner of Patents and Trademarks*